United States Patent
Yamada (10) Patent No.: US 10,948,711 B2
(45) Date of Patent: Mar. 16, 2021

(54) OPTICAL SCANNING DEVICE

(71) Applicant: Kensuke Yamada, Tokyo (JP)

(72) Inventor: Kensuke Yamada, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 119 days.

(21) Appl. No.: 16/296,449

(22) Filed: Mar. 8, 2019

(65) Prior Publication Data

US 2019/0285876 A1  Sep. 19, 2019

(30) Foreign Application Priority Data

Mar. 14, 2018  (JP) .............................. JP2018-046245

(51) Int. Cl.
*G02B 26/10* (2006.01)
*G02B 7/182* (2021.01)
*G02B 26/08* (2006.01)

(52) U.S. Cl.
CPC ......... *G02B 26/101* (2013.01); *G02B 7/1821* (2013.01); *G02B 26/0858* (2013.01)

(58) Field of Classification Search
None
See application file for complete search history.

(56) References Cited

U.S. PATENT DOCUMENTS

| | | | |
|---|---|---|---|
| 8,964,273 B2 | 2/2015 | Horie et al. | |
| 9,575,313 B2 | 2/2017 | Fujimoto | |
| 2010/0302609 A1* | 12/2010 | Huber ................ | G02B 26/0841 |
| | | | 359/199.4 |
| 2013/0083382 A1* | 4/2013 | Sekine ................ | H01L 41/0475 |
| | | | 359/224.1 |
| 2016/0274354 A1* | 9/2016 | Fujimoto ........... | G02B 26/0833 |
| 2020/0201029 A1* | 6/2020 | Maruyama ......... | G02B 26/0858 |
| 2020/0209616 A1* | 7/2020 | Takahashi ............ | G02B 26/101 |

FOREIGN PATENT DOCUMENTS

| | | |
|---|---|---|
| JP | 2013-186145 | 9/2013 |
| JP | 2016-001325 | 1/2016 |
| JP | 2016-170376 | 9/2016 |

* cited by examiner

*Primary Examiner* — Jennifer D. Carruth
(74) *Attorney, Agent, or Firm* — IPUSA, PLLC

(57) ABSTRACT

An optical scanning device includes a mirror support including a first surface and a second surface, a mirror for reflecting a laser beam being formed on the first surface; a driving beam that includes a beam extending in a direction orthogonal to a predetermined axis and is connected to the mirror support; a driving source that is formed on a surface of the beam and causes the mirror support to rotate around the predetermined axis; and a rib formed on the second surface of the mirror support at a position corresponding to the mirror. The first surface of the mirror support includes an area where the mirror is formed and an exposed area where the first surface is exposed.

13 Claims, 9 Drawing Sheets

OPTICAL SCANNING DEVICE

CROSS-REFERENCE TO RELATED APPLICATION

The present application is based upon and claims priority to Japanese Patent Application No. 2018-046245, filed on Mar. 14, 2018, the entire contents of which are incorporated herein by reference.

BACKGROUND OF THE INVENTION

1. Field of the Invention

An aspect of this disclosure relates to an optical scanning device.

2. Description of the Related Art

There is a known optical scanning device where a mirror is rotated around a rotational axis to scan light reflected by the mirror by using an actuator including, as a driving source, a piezoelectric element that includes an upper electrode formed on the upper surface of a piezoelectric thin film and a lower electrode formed on the lower surface of the piezoelectric thin film. The actuator also includes an upper wire connected to the upper electrode and a lower wire connected to the lower electrode that are used to apply a voltage to the piezoelectric thin film (see, for example, Japanese Laid-Open Patent Publication No. 2016-001325 and Japanese Patent No. 5876329).

The actuator includes a Micro Electro Mechanical Systems (MEMS) structure for rotating the mirror around the rotational axis, and the MEMS structure greatly deforms in the thickness direction. The MEMS structure may be implemented by a bellows structure to reduce the rigidity in the thickness direction while maintaining the rigidity in the in-plane direction. Also, the actuator may include a torsion bar as the MEMS structure and may be configured to use torsion of the torsion bar to rotate the mirror around the rotational axis.

It is known that when an optical scanning device using an actuator including a torsion bar is driven by resonance to cause torsional deformation in the torsion bar, stress generated by the torsional deformation of the torsion bar is applied to a mirror and the mirror is also deformed. Japanese Laid-Open Patent Publication No. 2016-170376 proposes forming a rib on the lower surface of a mirror to prevent the deformation of the mirror. The rib is provided to increase the rigidity of a joint between the torsion bar and the mirror and thereby prevent deformation of the mirror caused by the torsion of the torsion bar.

However, in a nonresonant-drive optical scanning device not including a torsion bar, a mirror is more likely to be deformed by a warp caused by membrane stress of a surface membrane formed on a surface of a mirror support for supporting the mirror rather than by stress generated by torsion of a beam. In this case, the entire mirror receives warping stress, a portion of the mirror not having a rib is deformed greatly, and the flatness of the mirror is reduced.

The warp caused by membrane stress of the surface membrane formed on the surface of the mirror support may be prevented and the flatness of the mirror may be improved by increasing the thickness and improving the rigidity of the entire mirror support. In this case, however, the resonance point lowers due to the increase in the mass of the mirror support, and unnecessary resonance tends to occur.

SUMMARY OF THE INVENTION

In an aspect of this disclosure, there is provided an optical scanning device that includes a mirror support including a first surface and a second surface, a mirror for reflecting a laser beam being formed on the first surface; a driving beam that includes a beam extending in a direction orthogonal to a predetermined axis and is connected to the mirror support; a driving source that is formed on a surface of the beam and causes the mirror support to rotate around the predetermined axis; and a rib formed on the second surface of the mirror support at a position corresponding to the mirror. The first surface of the mirror support includes an area where the mirror is formed and an exposed area where the first surface is exposed.

DESCRIPTION OF THE PREFERRED EMBODIMENTS

Embodiments of the present invention are described below with reference to the accompanying drawings. Throughout the accompanying drawings, the same reference numbers are used for the same components, and repeated descriptions of those components may be omitted.

Embodiment

Figure 1A:
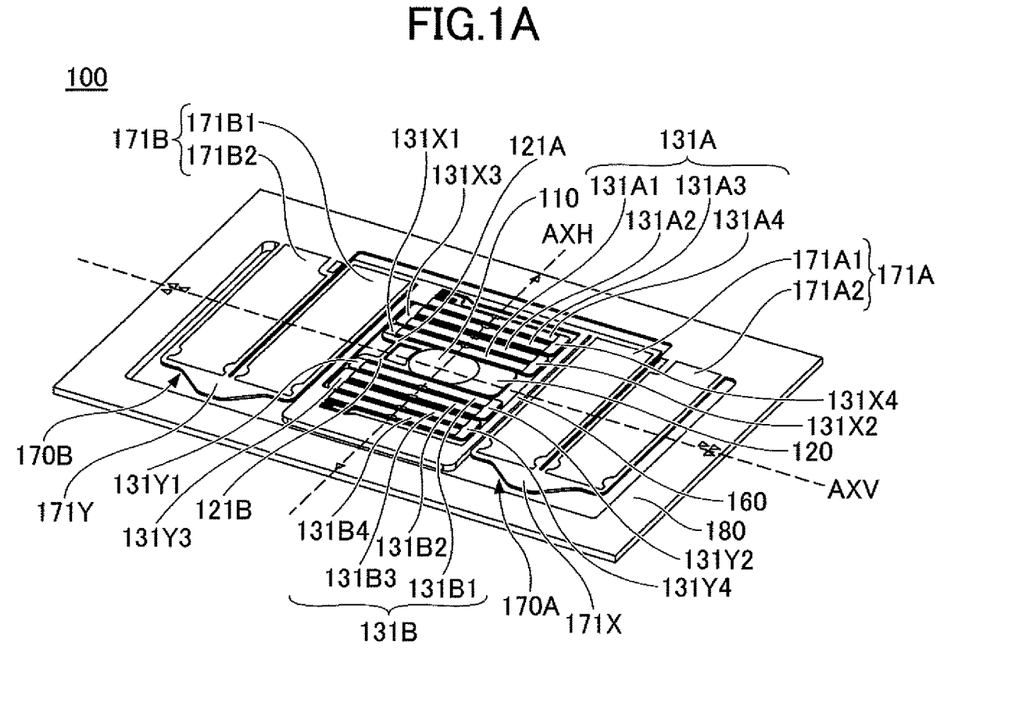
FIG. 1A is a top perspective view of an optical scanner of an optical scanning device according to an embodiment.
Figure 1B:
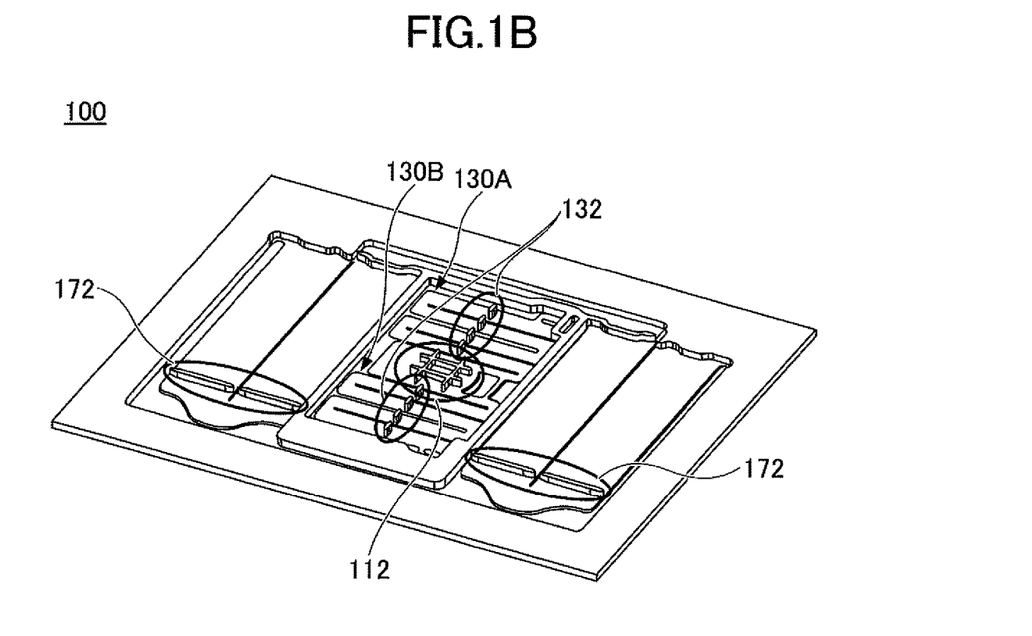
FIG. 1B is a bottom perspective view of the optical scanner of FIG. 1A.
Figure 2:
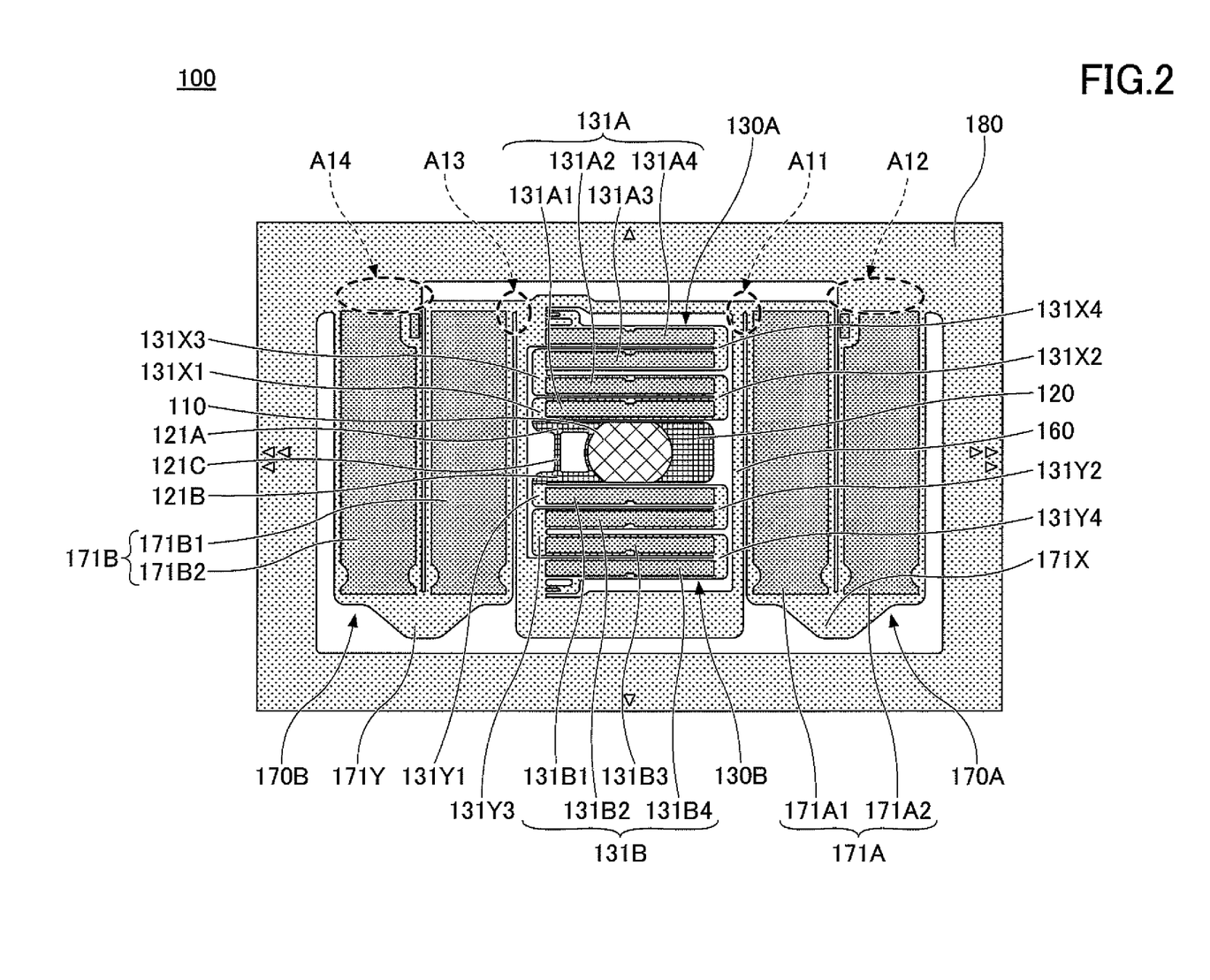
FIG. 2 is a top plan view of the optical scanner of FIG. 1A.
Figure 3:
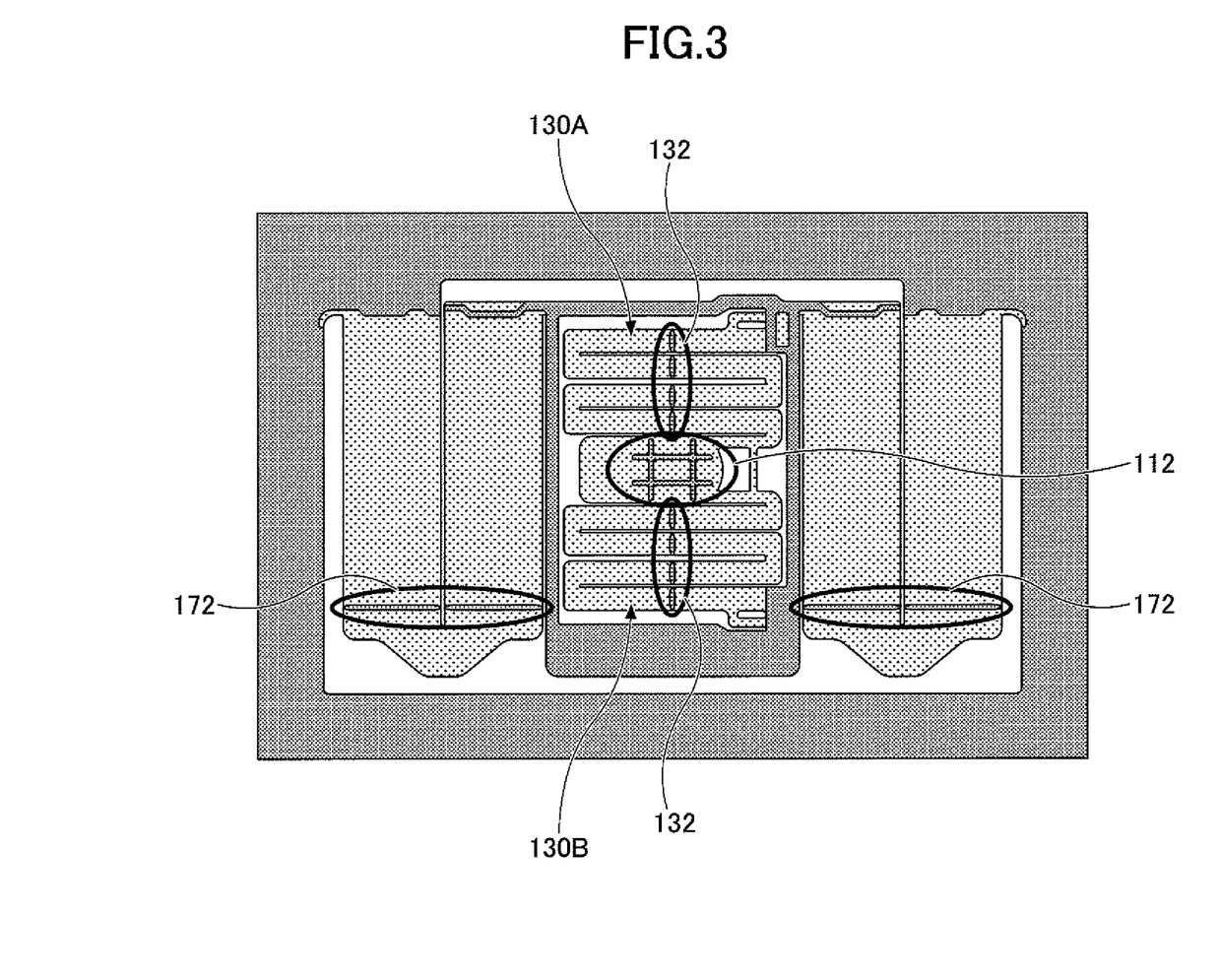
FIG. 3 is a bottom plan view of the optical scanner of FIG. 1A.

FIG. 1A is a top perspective view of an optical scanner 100 of an optical scanning device according to an embodiment. FIG. 1B is a bottom perspective view of the optical scanner 100 of FIG. 1A. FIG. 2 is a top plan view of the optical scanner 100 of FIG. 1A. FIG. 3 is a bottom plan view of the optical scanner 100 of FIG. 1A. The optical scanner 100 may be housed in a ceramic package including a package body and a package cover.

The optical scanner 100 scans an incoming laser beam emitted by a light source by causing a mirror 110 to rotate (or oscillate). The optical scanner 100 is, for example, a MEMS mirror where the mirror 110 is driven by driving sources such as piezoelectric elements. The mirror 110 of the optical scanner 100 reflects an incoming laser beam and scans the reflected laser beam two-dimensionally.

As illustrated in FIGS. 1A, 1B, and 2, the optical scanner 100 includes the mirror 110, a mirror support 120, coupling beams 121A and 121B, horizontal driving beams 130A and 130B, a movable frame 160, vertical driving beams 170A and 170B, and a fixed frame 180. The mirror 110 is disposed on an upper surface of the mirror support 120.

The horizontal driving beams 130A and 130B connected to the mirror support 120 are disposed on the corresponding sides of the mirror support 120 for supporting the mirror 110. The horizontal driving beams 130A and 130B are connected to the mirror support 120 via the coupling beams 121A and 121B. The horizontal driving beams 130A and 130B, the coupling beams 121A and 121B, the mirror support 120, and the mirror 110 are supported by the movable frame 160 surrounding these components. The horizontal driving beam 130A includes multiple rectangular horizontal beams that extend in the direction of a vertical-rotation axis AXV that is orthogonal to a horizontal-rotation axis AXH, and ends of adjacent horizontal beams are connected to each other via turnaround parts 131X2, 131X3, and 131X4 such that the horizontal driving beam 130A forms a zig-zag bellows structure as a whole. One end of the horizontal driving beam 130A is connected to the inner side of the movable frame 160, and another end of the horizontal driving beam 130A is connected via a turnaround part 131X1 and the coupling beam 121A to the mirror support 120. The horizontal driving beam 130B includes multiple rectangular horizontal beams that extend in the direction of the vertical-rotation axis AXV that is orthogonal to the horizontal-rotation axis AXH, and ends of adjacent horizontal beams are connected to each other via turnaround parts 131Y2, 131Y3, and 131Y4 such that the horizontal driving beam 130B forms a zig-zag bellows structure as a whole. One end of the horizontal driving beam 130B is connected to the inner side of the movable frame 160, and another end of the horizontal driving beam 130B is connected via a turnaround part 131Y1 and the coupling beam 121B to the mirror support 120.

The vertical driving beams 170A and 170B connected to the movable frame 160 are disposed on the corresponding sides of the movable frame 160. The vertical driving beam 170A includes multiple rectangular vertical beams that extend in the direction of the horizontal-rotation axis AXH, and ends of adjacent vertical beams are connected to each other via a turnaround part 171X such that the vertical driving beam 170A forms a zig-zag bellows structure as a whole. One end of the vertical driving beam 170A is connected to the inner side of the fixed frame 180, and another end of the vertical driving beam 170A is connected to the outer side of the movable frame 160. The vertical driving beam 170B includes multiple rectangular vertical beams that extend in the direction of the horizontal-rotation axis AXH, and ends of adjacent vertical beams are connected to each other via a turnaround part 171Y such that the vertical driving beam 170B forms a zig-zag bellows structure as a whole. One end of the vertical driving beam 170B is connected to the inner side of the fixed frame 180, and another end of the vertical driving beam 170B is connected to the outer side of the movable frame 160.

The horizontal driving beams 130A and 130B include, respectively, horizontal driving sources 131A and 131B that are piezoelectric elements. Also, the vertical driving beams 170A and 170B include, respectively, vertical driving sources 171A and 171B that are piezoelectric elements. The horizontal driving beams 130A and 130B and the vertical driving beams 170A and 170B function as an actuator that causes the mirror 110 to rotate (or oscillate) vertically and horizontally to scan a laser beam.

On the upper surfaces of the horizontal driving beams 130A and 130B, the horizontal driving sources 131A and 131B are formed for respective horizontal beams that are rectangular units including no curved section. Each of the horizontal driving sources 131A is a piezoelectric element formed on the upper surface of the horizontal driving beam 130A and includes a piezoelectric thin film, an upper electrode formed on the upper surface of the piezoelectric thin film, and a lower electrode formed on the lower surface of the piezoelectric thin film. Each of the horizontal driving sources 131B is a piezoelectric element formed on the upper surface of the horizontal driving beam 130B and includes a piezoelectric thin film, an upper electrode formed on the upper surface of the piezoelectric thin film, and a lower electrode formed on the lower surface of the piezoelectric thin film.

In each of the horizontal driving beams 130A and 130B, a driving voltage with a first waveform and a driving voltage with a second waveform obtained by vertically inverting the first waveform with reference to the median value of the first waveform are applied to horizontal driving sources 131A/131B on adjacent horizontal beams to cause the adjacent horizontal beams to warp in opposite vertical directions, and the accumulation of the vertical movement of the horizontal beams is transmitted to the mirror support 120. With the movement of the horizontal driving beams 130A and 130B, the mirror 110 and the mirror support 120 rotate (or oscillate) around the horizontal-rotation axis AXH. The direction of this rotation (or oscillation) is referred to as a horizontal direction, and the axis of this rotation (or oscillation) that passes through the center of the light reflection surface of the mirror 110 is referred to as the horizontal-rotation axis AXH. For example, nonresonant oscillation may be used for the horizontal driving by the horizontal driving beams 130A and 130B.

For example, the horizontal driving source 131A includes horizontal driving sources 131A1, 131A2, 131A3, and 131A4 that are formed on the first through fourth horizontal beams constituting the horizontal driving beam 130A. The horizontal driving source 131B includes horizontal driving sources 131B1, 131B2, 131B3, and 131B4 that are formed on the first through fourth horizontal beams constituting the horizontal driving beam 130B. In this case, the mirror 110 and the mirror support 120 can be rotated in the horizontal direction by driving the horizontal driving sources 131A1, 131B1, 131A3, and 131B3 using the first waveform and driving the horizontal driving sources 131A2, 131B2, 131A4, and 131B4 using the second waveform that is obtained by vertically inverting the first waveform with reference to the median value of the first waveform.

On the upper surfaces of the vertical driving beams 170A and 170B, the vertical driving sources 171A and 171B are formed for respective vertical beams that are rectangular units including no curved section. Each vertical driving source 171A is a piezoelectric element formed on the upper surface of the vertical driving beam 170A and includes a piezoelectric thin film, an upper electrode formed on the upper surface of the piezoelectric thin film, and a lower electrode formed on the lower surface of the piezoelectric thin film. Each vertical driving source 171B is a piezoelectric element formed on the upper surface of the vertical driving beam 170B and includes a piezoelectric thin film, an upper electrode formed on the upper surface of the piezoelectric thin film, and a lower electrode formed on the lower surface of the piezoelectric thin film.

In each of the vertical driving beams 170A and 170B, a driving voltage with a first waveform and a driving voltage with a second waveform obtained by vertically inverting the first waveform with reference to the median value of the first waveform are applied to vertical driving sources 171A/171B on adjacent vertical beams to cause the adjacent vertical beams to warp in opposite vertical directions, and the accumulation of the vertical movement of the vertical beams is transmitted to the movable frame 160. With the movement of the vertical driving beams 170A and 170B, the mirror 110 and the mirror support 120 rotate (or oscillate) around a rotation axis that is orthogonal to the horizontal-rotation axis AXH. The direction of this rotation (or oscillation) is referred to as a vertical direction, and this rotation axis that passes through the center of the light reflection surface of the mirror 110 is referred to as a vertical-rotation axis AXV. For example, nonresonant oscillation may be used for the vertical driving by the vertical driving beams 170A and 170B.

For example, the vertical driving source 171A includes vertical driving sources 171A1 and 171A2 that are formed on the first and second vertical beams constituting the vertical driving beam 170A. The vertical driving source 171B includes vertical driving sources 171B1 and 171B2 that are formed on the first and second vertical beams constituting the vertical driving beam 170B. In this case, the movable frame 160 connected to the mirror 110 can be rotated in the vertical direction by driving the vertical driving sources 171A1 and 171B1 using the first waveform and driving the vertical driving sources 171A2 and 171B2 using the second waveform that is obtained by vertically inverting the first waveform with reference to the median value of the first waveform.

In the optical scanning device of the present embodiment, the MEMS structure implementing the actuator is formed of, for example, a silicon-on-insulator (SOI) substrate including a support layer, a buried oxide (BOX) layer, and an active layer. Each of the fixed frame 180 and the movable frame 160 is comprised of the support layer, the BOX layer, and the active layer. On the other hand, each of components such as the horizontal driving beams 130A and 130B and the vertical driving beams 170A and 170B other than the fixed frame 180 and the movable frame 160 may be comprised of the active layer alone (one layer) or comprised of the BOX layer and the active layer (two layers).

In the optical scanning device of the present embodiment, a rib 112 is formed on a surface opposite a mirror-forming surface of the mirror support 120 on which the mirror 110 is formed. The rib 112 is disposed to face the mirror 110 across the mirror support 120. The rib 112 formed on the lower surface of the mirror support 120 is provided to improve the rigidity of the mirror support 120. The shape of the rib 112 formed on the surface opposite the mirror-forming surface of the mirror support 120 is described later.

In the optical scanning device of the present embodiment, the horizontal driving sources 131A and 131B are formed on first surfaces (upper surfaces) of the horizontal beams constituting the horizontal driving beams 130A and 130B, and ribs 132 are formed on second surfaces (lower surfaces) of the horizontal beams. The ribs 132 are positioned in the middle of the horizontal beams, i.e., along the horizontal-rotation axis AXH. Each rib 132 has a width in the longitudinal direction of the horizontal beam and a length in the lateral direction of the horizontal beam, and the width of the rib 132 is shorter than the length of the rib 132. For example, when a wafer including multiple MEMS structures is diced to manufacture separate MEMS structures, the ribs 132 formed on the second surfaces (lower surfaces) of the horizontal beams constituting the horizontal driving beams 130A and 130B can prevent the bellows structures from being excessively vibrated and damaged by a water flow and vibration generated during the dicing.

Also in the optical scanning device of the present embodiment, the vertical driving sources 171A and 171B are formed on first surfaces (upper surfaces) of the vertical beams constituting the vertical driving beams 170A and 170B, and ribs 172 are formed on second surfaces (lower surfaces) of the vertical beams. Each of the ribs 172 is positioned such that a distance from the joint between the corresponding one of the vertical beams and the corresponding one of the turnaround parts 171X and 171Y becomes 10% to 20% of the length of the vertical beams. Each rib 172 has a width in the longitudinal direction of the vertical beam and a length in the lateral direction of the vertical beam, and the width of the rib 172 is shorter than the length of the rib 172. The ribs 172 formed on the second surfaces (lower surfaces) of the vertical beams constituting the vertical driving beams 170A and 170B can prevent the vertical driving beams 170A and 170B from unnecessarily warping in a direction (the width or lateral direction of the vertical beams) that is orthogonal to the direction of vertical warping of the vertical driving beams 170A and 170B and can reduce the displacement of the mirror support 120 in the thickness direction.

The height (or thickness) of the rib 112 formed on the surface opposite the mirror-forming surface of the mirror support 120 is the same as the height (or thickness) of the fixed frame 180 and the movable frame 160. When the MEMS structure that functions as an actuator of the optical scanning device is formed of an SOI substrate, the rib 112 is formed of the BOX layer and the support layer on the lower surface of the mirror support 120 formed of the active layer. That is, around the rib 112, the support layer and the BOX layer are removed, and the active layer is exposed. The horizontal beams constituting the horizontal driving beams 130A and 130B are formed of the active layer, and the ribs 132 formed on the second surfaces (lower surfaces) of the horizontal beams are formed of the BOX layer and the support layer. The vertical beams constituting the vertical driving beams 170A and 170B are formed of the active layer, and the ribs 172 formed on the second surfaces (lower surfaces) of the vertical beams are formed of the BOX layer and the support layer. Instead of using the support layer of an SOI substrate, the ribs may be formed as steps by etching bulk silicon.

In the optical scanning device of the present embodiment, a surface membrane is formed on the upper surface of the mirror support 120 in a mirror-forming area where the mirror 110 is formed. For example, the surface membrane includes a silicon dioxide film formed on the upper surface of the mirror support 120, an aluminum oxide film formed on the upper side of the silicon dioxide film, a silver-containing film form on the upper side of the aluminum oxide film, and a reflection enhancing film formed on the upper side of the silver-containing film. The surface of the silver-containing film functions as the mirror 110. The configuration of the surface membrane is described later.

The surface membrane is removed from the upper surface of the mirror support 120 except for the mirror-forming area to form an exposed area 120D where the first surface of the mirror support 120 is exposed. This configuration decreases the area of the surface membrane and thereby decreases membrane stress that is generated by the surface membrane and degrades the flatness of the mirror 110. Thus, this configuration makes it possible to prevent the degradation of the flatness of the mirror 110 due to the membrane stress generated by the surface membrane formed on the upper surface of the mirror support 120.

The exposed area 120D is formed by removing the surface membrane comprised of at least one of films forming the mirror 110 from the upper surface of the mirror support 120.

The surface membrane may be formed of one or more of a silicon dioxide film, an aluminum oxide film, a silver-containing film, and a reflection enhancing film.

Also in the optical scanning device of the present embodiment, the rib 112 is formed on a surface opposite the mirror-forming surface of the mirror support 120. The rib 112 can increase the rigidity of the mirror support 120 and prevent the prevent the degradation of the flatness of the mirror 110 due to the membrane stress generated by the surface membrane formed on the upper surface of the mirror support 120.

Figure 4:
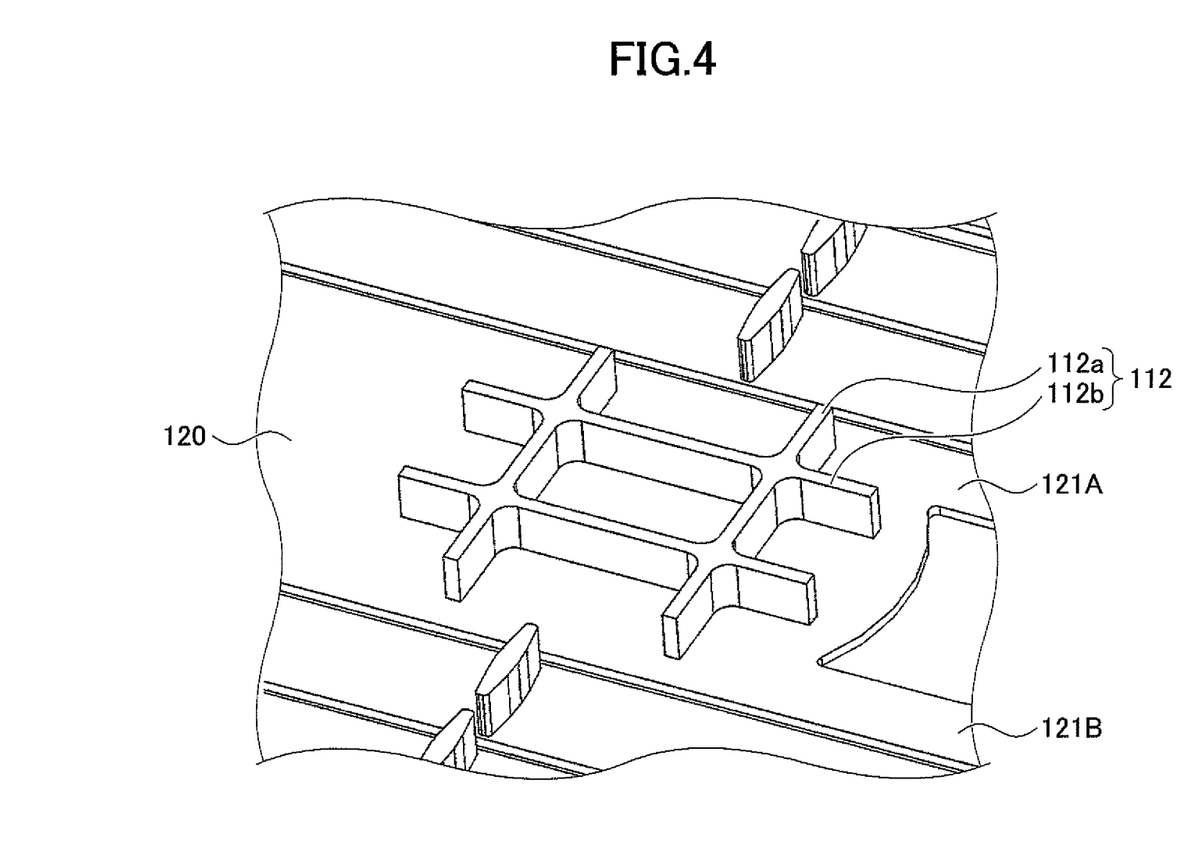
FIG. 4 is an enlarged view of a portion of the optical scanner of FIG. 3.

Next, the shape of the rib 112 formed on the surface opposite the mirror-forming surface of the mirror support 120 is described. FIG. 4 is an enlarged view of a portion of the optical scanner 100. As illustrated in FIG. 4, the rib 112 has a grid shape formed by first ribs 112a extending in a first direction and second ribs 112b extending in a second direction that is orthogonal to the first direction. The first ribs 112a and the second ribs 112b intersect with each other. Although the number of the first ribs 112a in FIG. 4 is two, the number of the first ribs 112a may be three or more. Although the number of the second ribs 112b in FIG. 4 is two, the number of the second ribs 112b may be three or more. Forming the rib 112 on a surface opposite the mirror-forming surface of the mirror support 120 makes it possible to increase the rigidity of the mirror support 120 while suppressing the decrease in the resonant frequency of the mirror support 120 and suppressing the increase in the moment of inertia of the mirror support 120.

Figure 5:
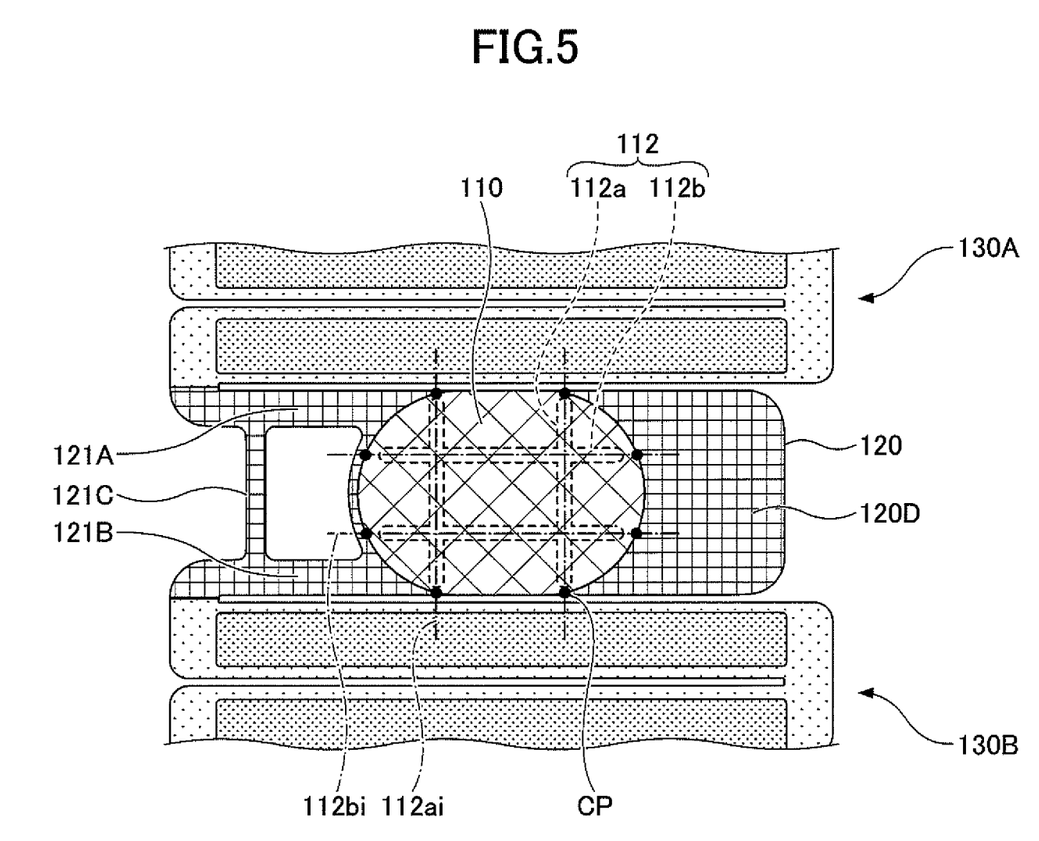
FIG. 5 is an enlarged view of a portion of the optical scanner of FIG. 2.

FIG. 5 is an enlarged view of a portion of the optical scanner 100. As indicated by dotted lines in FIG. 5, the rib 112 is formed on a surface opposite the mirror-forming surface of the mirror support 120. In other words, the rib 112 is formed on the lower surface of the mirror support 120 in an area that corresponds to the mirror-forming area on the upper surface of the mirror support 120. In FIG. 5, dashed-dotted lines formed by extending the first ribs 112a are referred to as first virtual straight lines 112ai, and dashed-dotted lines formed by extending the second ribs 112b are referred to as second virtual straight lines 112bi. The first virtual straight lines 112ai and the second virtual straight lines 112bi intersect with the outer circumference of the mirror 110 at intersection points CP indicated by bullets. The rib 112 is configured such that sections of the outer circumference of the mirror 110 defined by adjacent pairs of the intersection points CP have substantially the same length. Forming the rib 112 as illustrated in FIG. 5 makes it possible to uniformly increase the rigidity of the entire mirror support 120 while suppressing the decrease in the resonant frequency and the increase in the moment of inertia of the mirror support 120 that are caused by the increase in the weight of the mirror support 120. Here, "substantially the same length" indicates that the lengths of the sections of the outer circumference of the mirror 110 defined by adjacent pairs of the intersection points CP are within such a range that the above described effects can be achieved as in the case where the lengths of the sections of the outer circumference of the mirror 110 defined by adjacent pairs of the intersection points CP are the same.

The rib 112 illustrated in FIGS. 4 and 5 may also include an annular third rib that extends along the outer circumference of the mirror 110. In this case, the first ribs 112a and the second ribs 112b may intersect with the annular third rib. That is, in FIG. 5, the first ribs 112a and the second ribs 112b may be extended to intersect with the annular third rib. Providing the third rib intersecting with the first ribs 112a and the second ribs 112b makes it possible to further increase the rigidity of the mirror support 120.

Figure 6A:
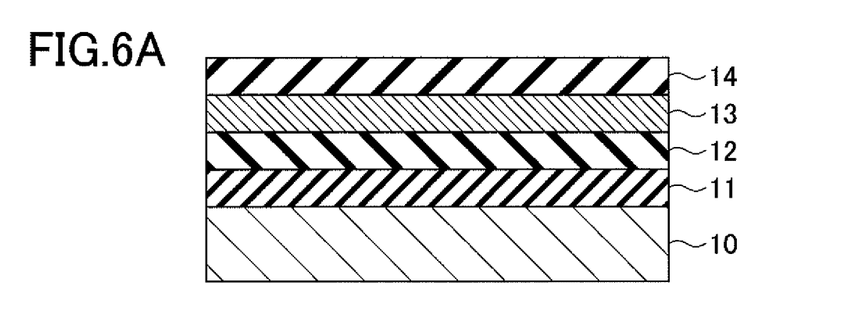
FIGS. 6A through 6D are cross-sectional views of an optical scanner according to an embodiment.

FIG. 6A is a cross-sectional view of the mirror support 120 in the mirror-forming area. In the mirror-forming area where the mirror 110 is formed, a surface membrane is formed on the upper surface of an active layer 10 (an active layer of an SOI substrate) implementing the mirror support 120. In FIG. 6A, the surface membrane includes, for example, a silicon dioxide film 11 formed on the upper surface of the active layer 10 implementing the mirror support 120, an aluminum oxide film 12 formed on the upper side of the silicon dioxide film 11, a silver-containing film 13 form on the upper side of the aluminum oxide film 12, and a reflection enhancing film 14 formed on the upper side of the silver-containing film 13. The silver-containing film 13 implements the mirror 110.

Figure 6B:
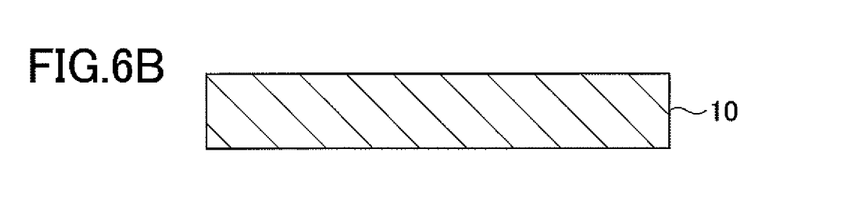

FIG. 6B is a cross-sectional view of the mirror support 120 in an area where the mirror 110 is not formed. FIG. 6B corresponds to the exposed area 120D where the upper surface of the mirror support 120 is exposed. That is, in the area where the mirror 110 is not formed, the surface membrane including the silicon dioxide film 11, the aluminum oxide film 12, the silver-containing film 13, and the reflection enhancing film 14 is removed to expose the active layer 10 that implements the mirror support 120. This configuration decreases the area of the surface membrane and thereby decreases membrane stress that is generated by the surface membrane and degrades the flatness of the mirror 110. Thus, this configuration makes it possible to prevent the degradation of the flatness of the mirror 110 due to the membrane stress generated by the surface membrane formed on the upper surface of the mirror support 120.

Figure 6C:
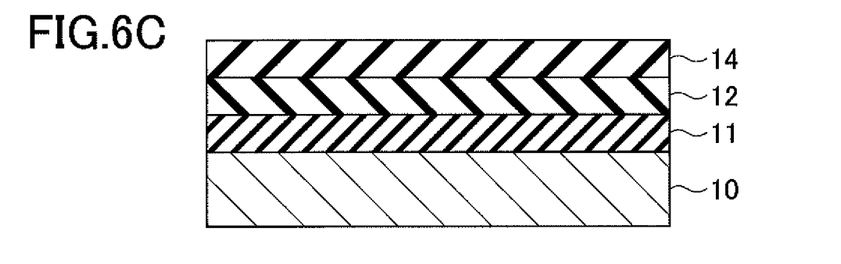

FIG. 6C is a cross-sectional view of the horizontal driving beam 130A/130B or the vertical driving beam 170A/170B (which is hereafter referred to as a "driving beam"), and corresponds to an area where none of the horizontal driving sources 131A and 131B and the vertical driving sources 171A and 171B (which is hereafter referred to as a "driving source") is formed. A surface membrane is formed on the upper surface of the active layer 10 (an active layer of an SOI substrate) implementing the driving beam. In FIG. 6C, the surface membrane includes, for example, the silicon dioxide film 11 formed on the upper surface of the active layer 10 implementing the driving beam, the aluminum oxide film 12 formed on the upper side of the silicon dioxide film 11, and the reflection enhancing film 14 formed on the upper side of the aluminum oxide film 12.

Figure 6D:
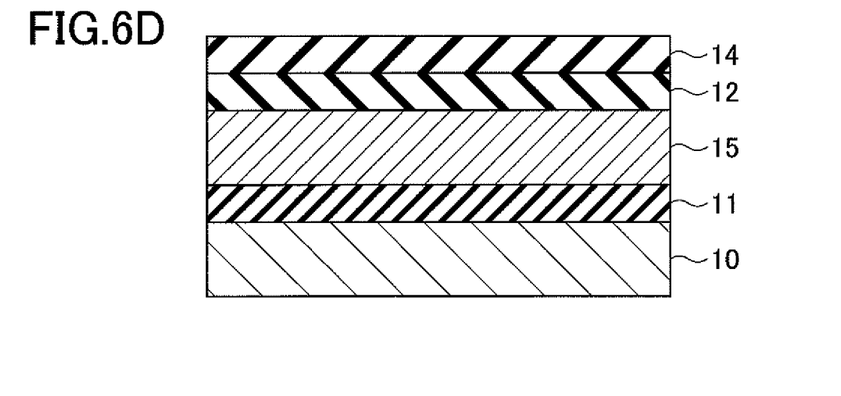

FIG. 6D is a cross-sectional view of the driving beam in an area where the driving source is formed. A surface membrane is formed on the upper surface of the active layer 10 (an active layer of an SOI substrate) implementing the driving beam. In FIG. 6D, the surface membrane includes, for example, the silicon dioxide film 11 formed on the upper surface of the active layer 10 implementing the driving beam, a piezoelectric element 15 formed on the upper side of the silicon dioxide film 11, the aluminum oxide film 12 formed on the upper side of the piezoelectric element 15, and the reflection enhancing film 14 formed on the upper side of the aluminum oxide film 12. The piezoelectric element 15 includes a piezoelectric thin film and upper and lower electrodes on the upper and lower surfaces of the piezoelectric thin film.

The surface membrane may be formed of one or more of a silicon dioxide film, an aluminum oxide film, a silver-containing film, and a reflection enhancing film. For example, in the mirror-forming area illustrated by FIG. 6A, the surface membrane formed on the upper surface of the active layer 10 implementing the mirror support 120 may include one or more of the silicon dioxide film, the aluminum oxide film, and the reflection enhancing film in addition to the silver-containing film. In the area illustrated by FIG. 6C where the driving source is not formed, the surface membrane formed on the upper surface of the active layer 10 implementing the driving beam may include one or more of the silicon dioxide film, the aluminum oxide film, and the reflection enhancing film. In the area illustrated by FIG. 6D where the driving source is formed, the surface membrane formed on the upper surface of the active layer 10 implementing the driving beam may include one or more of the silicon dioxide film, the aluminum oxide film, and the reflection enhancing film in addition to the piezoelectric element implementing the driving source. In the exposed area 120D illustrated by FIG. 6B, the surface membrane formed of one or more of the silicon dioxide film, the aluminum oxide film, the silver-containing film, and the reflection enhancing film is completely removed.

Membrane stress in the compression direction occurs in the silicon dioxide film that is a thermally-oxidized film and causes a warp toward the support layer of the SOI substrate. Membrane stress in the stretching direction occurs in the aluminum oxide film and causes a warp toward the active layer of the SOI substrate. The warp direction of the reflection enhancing film varies depending on the configuration of the reflection enhancing film. The warp direction of the mirror is determined by the resultant of membrane stress that occurs in the silicon dioxide film, the aluminum oxide film, and the reflection enhancing film.

If a surface membrane including one or more of the silicon dioxide film, the aluminum oxide film, and the reflection enhancing film exists also in an area other than the mirror-forming area on the mirror support, the entire mirror support warps and this warp increases the amount of warp of the mirror. For this reason, the surface membrane is removed from areas other than the mirror-forming area on the mirror support. Although the surface membrane in the mirror-forming area causes a warp, this configuration makes it possible to reduce the amount of warp caused by the surface membrane in the entire mirror support.

Because the surface membrane remains in the mirror-forming area, the surface membrane causes the mirror to warp. However, it is possible to increase the warp rigidity of the mirror and improve the flatness of the mirror by forming a rib on the back side of the mirror.

Regardless of the presence of the surface membrane, the warp of the mirror can be suppressed and the flatness of the mirror can be improved by leaving the support layer on the entire lower surface of the mirror support instead of only on the back side of the mirror. However, if the support layer is left on the entire lower surface of the mirror support, the mass of the mirror support increases and the resonant frequency lowers. As a result, unnecessary resonance tends to occur when the mirror is oscillated. Also, because the moment of inertia of the mirror support increases, the mirror support tends to move by a large amount when vibration or an impact is applied to the mirror support and tends to be easily broken. For the above reasons, it is preferable to make the area of the rib on the lower surface of the mirror support as small as possible to reduce the mass of the mirror support.

The shape of the rib on the back side of the mirror is preferably formed by multiple lines that connect ends of the mirror. If the rib is composed of line-shaped components that do not extend across the mirror and have gaps in the middle, the mirror warps at a large angle at the gaps and even if the warp of the other portions of the mirror is prevented by the rib, the ends of the mirror are displaced greatly in the thickness direction. Because the ends of the mirror are most greatly displaced and the mirror tends to greatly warp at positions between rib components, a rib is preferably formed to equally divide the outer circumference of the mirror. Such a rib makes it possible to prevent a large warp in a portion of the mirror and to improve the flatness (levelness) of the entire mirror.

Variation

Figure 7A:
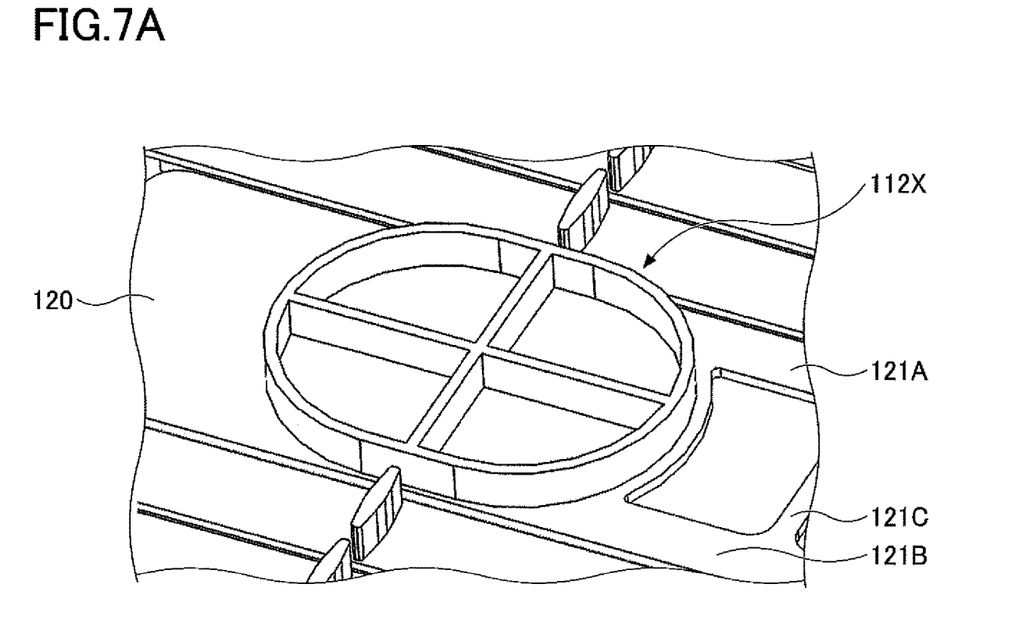
FIGS. 7A and 7B are enlarged views of portions of an optical scanner of an optical scanning device according to a variation.
Figure 7B:
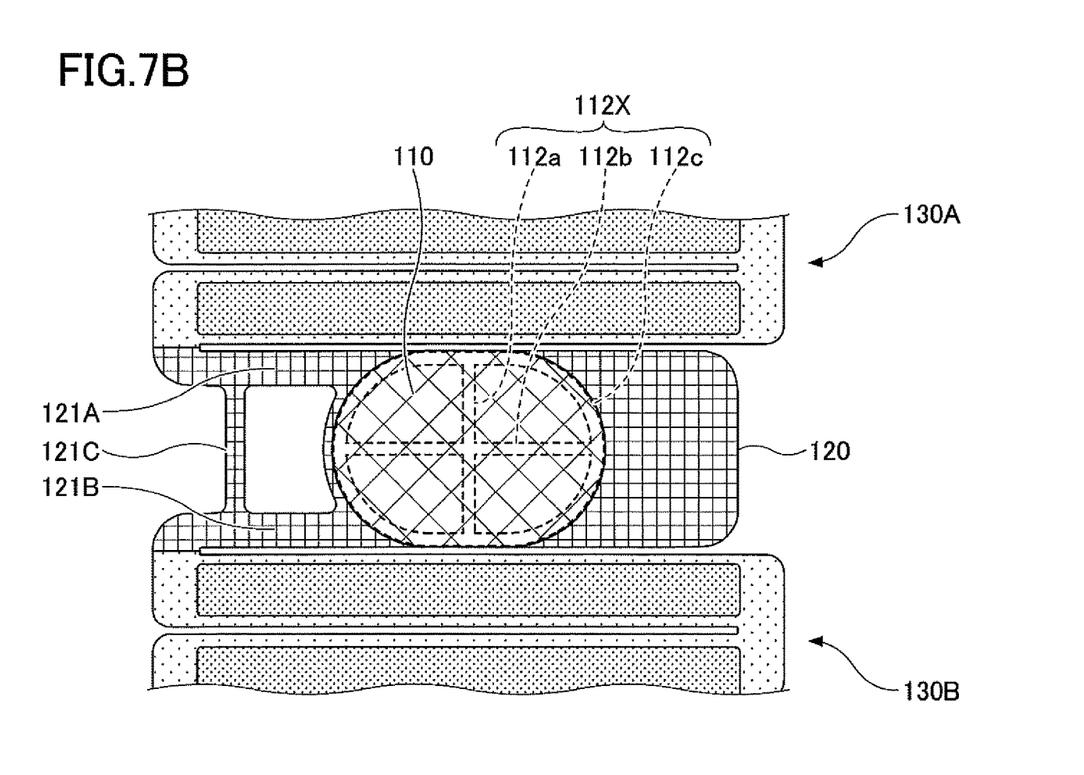

FIGS. 7A and 7B are enlarged views of portions of the optical scanner 100 according to a variation. As illustrated in FIG. 7A and indicated by dotted lines in FIG. 7B, a rib 112X is formed on a surface opposite the mirror-forming surface of the mirror support 120. In other words, the rib 112X is formed on the lower surface of the mirror support 120 in an area that corresponds to the mirror-forming area on the upper surface of the mirror support 120. The rib 112X includes a first rib 112a extending in a first direction, a second rib 112b extending in a second direction orthogonal to the first direction, and an annular third rib 112c extending along the outer circumference of the mirror. The first rib 112a and the second rib 112b intersect with the third rib 112c. Forming the rib 112X as illustrated in FIGS. 7A and 7B makes it possible to uniformly increase the rigidity of the entire mirror support 120 while suppressing the decrease in the resonant frequency and the increase in the moment of inertia of the mirror support 120 that are caused by the increase in the weight of the mirror support 120.

A rib formed on a surface opposite the mirror-forming surface of the mirror support 120 may have a shape of a cross, a shape obtained by combining crosses, or a shape obtained by combining a ring and one or more crosses. The outer circumference of the mirror tends to warp most greatly. Therefore, forming a rib including an oval ring-shaped component extending along the outer circumference of the mirror in addition to a cross-shaped component makes it possible to prevent the outer circumference of the mirror from warping and to further improve the flatness of the mirror. However, adding the oval ring-shaped component to the rib may increase the moment of inertia of the mirror support, lower the resonant frequency of the mirror support, and cause unnecessary resonance.

Example 1

Figure 8A:
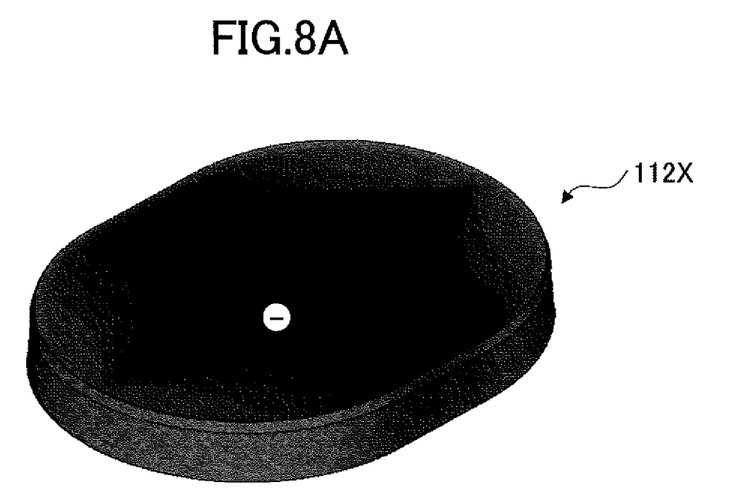
FIGS. 8A and 8B are drawings illustrating deformation of a mirror that occurs when an optical scanning device is driven.
Figure 8B:
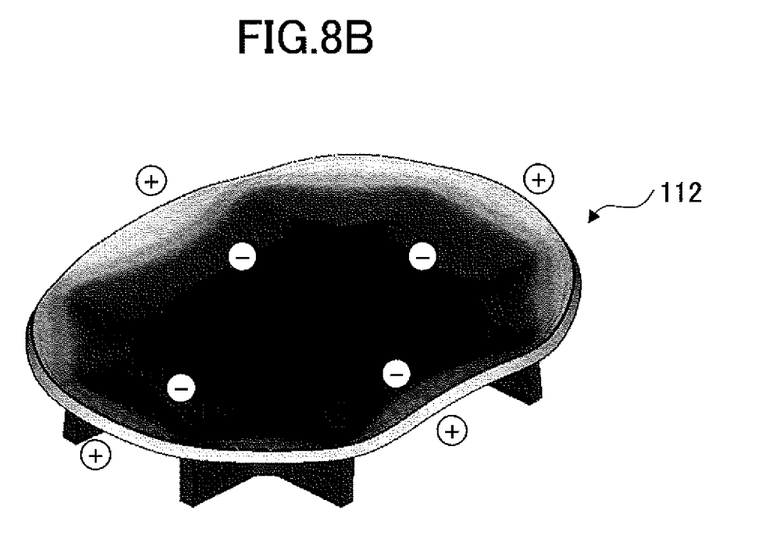

FIGS. 8A and 8B are drawings illustrating deformation of a mirror that occurs when the optical scanning device is driven. Deformation of the mirror observed when the optical scanning device is driven is calculated through a simulation. In FIGS. 8A and 8B, the lower surface is a rib-forming surface (where a rib is formed) and the upper surface is a mirror-forming surface (where a mirror is formed). Also in FIGS. 8A and 8B, a higher gradation level (density) at a position indicated by a "−" sign indicates a greater amount of downward deformation; and a lower gradation level (density) at a position indicated by a "+" sign indicates a greater amount of upward deformation.

FIG. 8A corresponds to the variation illustrated in FIGS. 7A and 7B. The rib 112X includes the first rib 112a extending in the first direction, the second rib 112b extending in the second direction orthogonal to the first direction, and the annular third rib 112c extending along the outer circumference of the mirror. The first rib 112a and the second rib 112b intersect with the third rib 112c. The first rib 112a and the second rib 112b form a cross shape that prevents the downward deformation of the mirror, and the third rib 112c prevents the deformation of the mirror along the outer circumference. In FIG. 8A, the difference in gradation levels (density) between the portions indicated by the "−" signs and the "+" signs is small. This indicates that the deformation is generally suppressed and the flatness of the mirror is improved. However, it should be noted that the third rib 112c may increase the moment of inertia of the mirror support 120 and lower the resonant frequency of the mirror support 120.

FIG. 8B corresponds to the embodiment illustrated in FIGS. 4 and 5. The rib 112 has a grid shape formed by two first ribs 112a extending in the first direction and two second ribs 112b extending in the second direction that is orthogonal to the first direction. The downward deformation of the mirror is suppressed by the grid shape formed by the first rib 112a and the second rib 112b. Upward deformation is observed along the outer circumference of the mirror. In FIG. 8B, although there are portions where the difference in gradation levels (density) is large compared with FIG. 8A, the deformation of the entire mirror is suppressed by the grid-shaped rib and the flatness of the mirror is improved.

Example 2

Figure 9A:
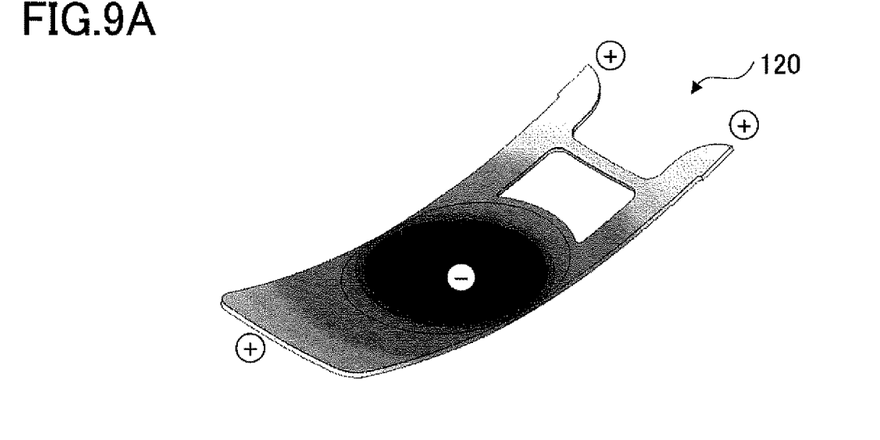
FIGS. 9A through 9C are drawings illustrating deformation of a mirror that occurs when an optical scanning device is driven.
Figure 9B:
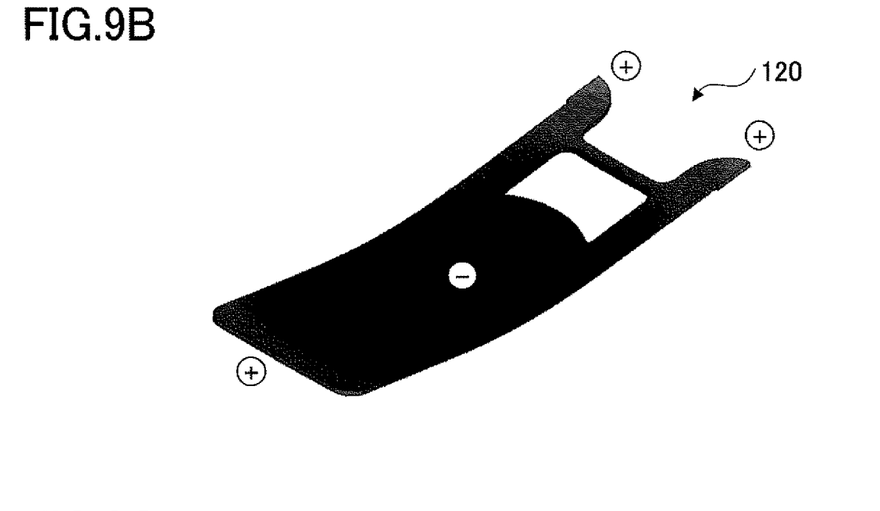
Figure 9C:
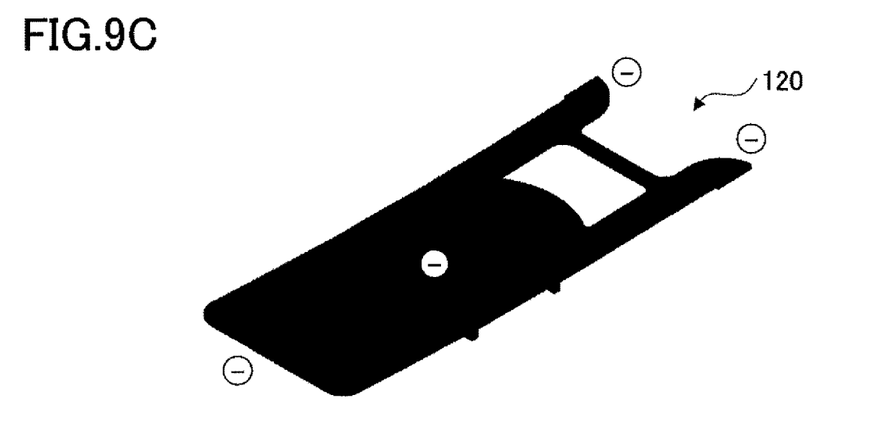

FIGS. 9A through 9C are drawings illustrating deformation of a mirror that occurs when the optical scanning device is driven. Deformation of the mirror observed when the optical scanning device is driven is calculated through a simulation. Each of FIGS. 9A through 9C corresponds to the mirror support 120 and the coupling beams 121A and 121B. In FIGS. 9A through 9C, the lower surface is a rib-forming surface (where a rib is formed) and the upper surface is a mirror-forming surface (where a mirror is formed). Also in FIGS. 9A through 9C, a higher gradation level (density) at a position indicated by a "−" sign indicates a greater amount of downward deformation; and a lower gradation level (density) at a position indicated by a "+" sign indicates a greater amount of upward deformation.

FIG. 9A corresponds to a comparative example that is different from the optical scanning device of FIGS. 4 and 5 in that no rib is formed on the lower surface of the mirror support and the surface membrane on areas of the mirror support other than the mirror-forming area is not removed. In FIG. 9A, the difference in gradation levels (density) between the portions indicated by the "−" sign and the "+" signs is large, and the mirror support is greatly deformed.

FIG. 9B corresponds to a reference example that is different from the optical scanning device of FIGS. 4 and 5 in that no rib is formed on the lower surface of the mirror support. In the reference example of FIG. 9B, the surface membrane on areas of the mirror support other than the mirror-forming area is removed. In FIG. 9B, the difference in gradation levels (density) between the portions indicated by the "−" sign and the "+" signs is smaller compared with the comparative example of FIG. 9A, and the deformation of the mirror support is generally suppressed.

FIG. 9C corresponds to the optical scanning device of FIGS. 4 and 5 where a rib is formed on the lower surface of the mirror support, and the surface membrane on areas of the mirror support other than the mirror-forming area is removed. In FIG. 9C, the difference in gradation levels (density) between the portions indicated by the "−" sign and the "+" signs is smaller even compared with the reference example of FIG. 9B, and the deformation of the mirror support is well suppressed.

As described above, in the optical scanner of the optical scanning device of the embodiment, the surface membrane is removed from areas of the mirror support other than the mirror-forming area to suppress the warp of the entire mirror support caused by the surface membrane. Also, a rib is formed on the back side of the mirror to increase the warp rigidity of the mirror and improve the flatness of the mirror.

In the above embodiment, each of the horizontal driving beam and the vertical driving beam has a zig-zag bellows structure as a whole and is driven by nonresonant driving. In a nonresonant-drive optical scanning device not including a torsion bar, a mirror is deformed by a warp caused by membrane stress of a surface membrane formed on a surface of a mirror support. The present embodiment makes it possible to suppress the deformation of the mirror and improve the flatness of the mirror.

An optical scanning device according to embodiments of the present invention is described above. However, the present invention is not limited to the specifically disclosed embodiments, and variations and modifications may be made without departing from the scope of the present invention. For example, although an actuator is used for an optical scanning device including a mirror in the above embodiment, the actuator may also be used to drive an object other than a mirror, and the present invention may also be applied to a device that does not include a mirror. An optical scanning device according to an embodiment of the present invention is preferably used for an optical coherence tomography device of a funduscope. In an optical coherence tomography device of a funduscope, resonant driving is not necessary because one of the axes operates at high speed as in a projector, and it is desired that tilt angles can be freely set and adjusted to perform optical scanning. Accordingly, an optical scanner where nonresonant driving is used for both of two axes as in the above embodiment is preferably used for an optical coherence tomography device of a funduscope. An optical scanning device according to an embodiment of the present invention may also be used for a projection device.

What is claimed is:
1. An optical scanning device, comprising:
  a mirror support including
    a substrate that includes a support layer and an active layer stacked over a first surface of the support layer, and
    a surface membrane that is formed on the active layer and reflects a laser beam;
  a driving beam that includes a beam extending in a direction orthogonal to a predetermined axis and is connected to the mirror support;
  a driving source that is formed on a surface of the beam and causes the mirror support to rotate around the predetermined axis; and
  a rib formed on a second surface of the support layer of the mirror support at a position corresponding to the surface membrane, wherein the mirror support includes an area where the surface membrane is formed and an exposed area where the active layer is exposed.

2. The optical scanning device as claimed in claim 1, wherein the rib has a grid shape formed by first ribs extending in a first direction and second ribs extending in a second direction orthogonal to die first direction and intersecting with the first ribs.

3. The optical scanning device as claimed in claim 2, wherein
first virtual straight lines formed by extending the first ribs and second virtual straight lines formed by extending the second ribs intersect with an outer circumference of the mirror at intersection points; and
sections of the outer circumference of the mirror defined by adjacent pairs of the intersection points have substantially a same length.

4. The optical scanning device as claimed in claim 2, wherein the rib further includes an annular third rib that extends along an outer circumference of the mirror.

5. The optical scanning device as claimed in claim 4, wherein the first ribs and the second ribs intersect with the third rib.

6. The optical scanning device as claimed in claim 1, wherein
the rib includes a first rib extending in a first direction, a second rib extending in a second direction orthogonal to the first direction, and an annular third rib extending along an outer circumference of the mirror; and
the first rib and the second rib intersect with the third rib.

7. The optical scanning device as claimed in claim 1, wherein
the driving beam includes multiple beams extending in the direction orthogonal to the predetermined axis; and
ends of each adjacent pair of the beams are connected to each other via a turnaround part such that the driving beam forms a zig-zag bellows structure as a whole.

8. The optical scanning device as claimed in claim 1, wherein the mirror is implemented by a silver-containing film.

9. The optical scanning device as claimed in claim 1, wherein the driving source causes the mirror support to rotate around the predetermined axis by nonresonant driving.

10. An optical scanning device comprising:
a mirror support including a first surface and a second surface, a mirror for reflecting a laser beam being formed on the first surface,
a driving beam that includes a beam extending, in a direction orthogonal to a predetermined axis and is connected to the mirror support,
a driving source that is formed on a surface of the beam and causes the mirror support to rotate around the predetermined axis; and a rib formed on the second surface of the mirror support at a position corresponding to the mirror, wherein
the first surface of the mirror support includes an area where the mirror is formed and an exposed area where the first surface is exposed;
the exposed area is formed by removing a surface membrane comprised of at least one of films forming the mirror from the first surface of the mirror support; and
the surface membrane includes a silicon dioxide film formed on the first surface of the mirror support, an aluminum oxide film formed on an upper side of the silicon dioxide film, a silver-containing film formed on an upper side of the aluminum oxide film, and a reflection enhancing film formed on an upper side of the silver-containing film.

11. The optical scanning device as claimed in claim 10, wherein
a second surface membrane is formed in an area of the beam where the driving source is formed; and
the second surface membrane includes a silicon dioxide film formed on the surface of the beam, a piezoelectric element that is formed on an upper side of the silicon dioxide film and implements the driving source, an aluminum oxide film formed on an upper side of the piezoelectric element, and a reflection enhancing film formed on an upper side of the aluminum oxide film.

12. The optical scanning device as claimed in claim 11, wherein
a third surface membrane is formed in an area of the beam other than the area where the driving source is formed; and
the third surface membrane includes a silicon dioxide film formed on the surface of the beam, an aluminum oxide film formed on an upper side of the silicon dioxide film, and a reflection enhancing film formed on an upper side of the aluminum oxide film.

13. A method of manufacturing an optical scanning device, the method comprising:
forming a mirror for reflecting a laser beam on a first surface of a mirror support;
forming a rib on a second surface of the mirror support at a position corresponding to the mirror;
forming a driving beam that includes a beam extending in a direction orthogonal to a predetermined axis and is connected to the mirror support;
forming, on a surface of the beam, a driving source for causing the mirror support to rotate around the predetermined axis; and
forming an exposed area where the first surface is exposed by removing a surface membrane comprised of at least one of films forming the mirror from the first surface of the mirror support.

* * * * *